No. 844,780. PATENTED FEB. 19, 1907.
A. W. CRAM.
TEA KETTLE.
APPLICATION FILED JAN. 6, 1906.

Witnesses:
H. B. Davis
Cynthia Doyle

Inventor:
A. W. Cram
by Noyes & Hammond
Atty's

UNITED STATES PATENT OFFICE.

ALONZO W. CRAM, OF HAVERHILL, MASSACHUSETTS.

TEA-KETTLE.

No. 844,780.  Specification of Letters Patent.  Patented Feb. 19, 1907.

Application filed January 6, 1906. Serial No. 294,885.

*To all whom it may concern:*

Be it known that I, ALONZO W. CRAM, of Haverhill, county of Essex, State of Massachusetts, have invented an Improvement in Tea-Kettles, of which the following description, in connection with the accompanying drawings, is a specification, like characters on the drawings representing like parts.

My invention has for its principal object to provide a form of automatic tea-kettle cover which is adapted to open automatically to permit the flow of water into the kettle and to close automatically when the flow has ceased, which may be manufactured economically and without increase over the cost of the ordinary cover, and which is adapted to be readily removed to permit access of the interior of the kettle for the purpose of cleaning, &c.

A further object of my invention is to provide means for preventing the sides of the kettle from becoming blackened by smoke or discolored by heat.

For an understanding of my invention reference is made to the accompanying drawings, in which—

Figure 1:
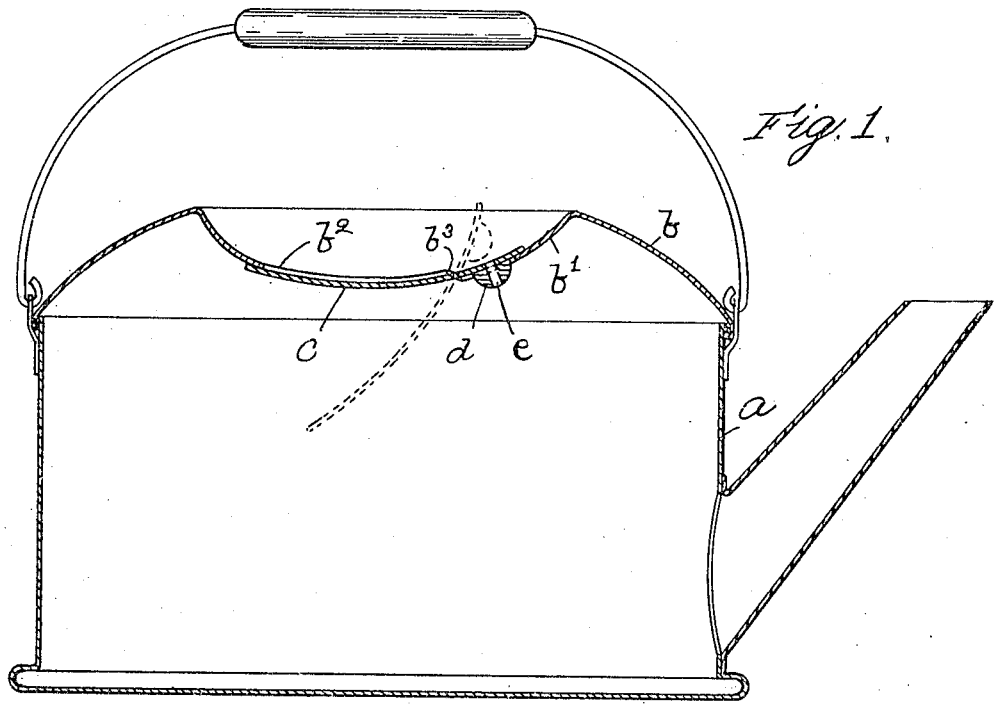
Figure 2:
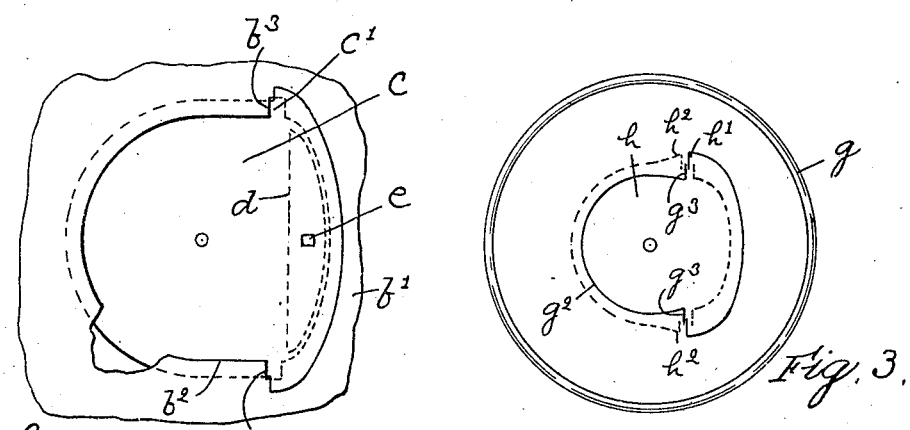
Figure 3:
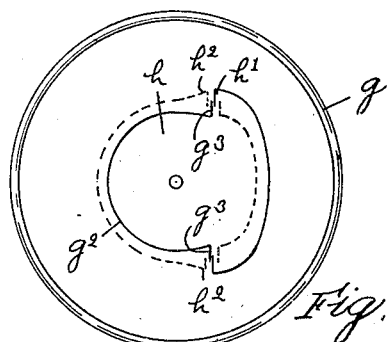
Figure 4:
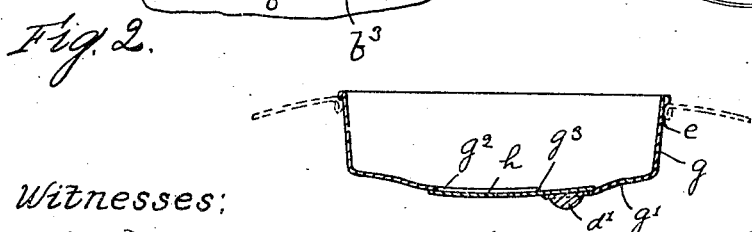

Figure 1 is a vertical central section of an ordinary tea-kettle provided with my invention. Fig. 2 is a plan view of the top portion thereof. Fig. 3 is a plan view of a modified form of my invention. Fig. 4 is a sectional view of the form shown in Fig. 3.

As shown in Fig. 1, the bottom portion $a$ of the kettle is soldered to the top portion $b$ in the usual manner, and a basin-shaped recess or depression is provided in the middle of said top portion, the bottom of said recess being preferably integral with the top portion $b$ and preferably being formed in the process of spinning the latter. The bottom $b'$ of said depressed or recessed portion is provided with an opening $b^2$ in the middle portion thereof, said opening preferably having curved ends and parallel sides, although the exact form is not material. Said bottom $b'$ is also provided with a pair of oppositely-disposed notches $b^3$, which lead from said opening at points approximately midway between one end and the middle thereof. A basin-shaped or concaved valve-plate $c$, of similar shape to said opening $b^2$, but of somewhat greater dimensions, is arranged to extend through said opening $b^2$, its edge portion being located in said notches $b^3$, which latter are of sufficient width to permit the plate to swing therein on projecting pivot-lugs $c'$, formed on said plate at opposite sides thereof, and adapted to engage the bottom $b'$ adjacent the ends of said notches. Said lugs $c'$ are located in corresponding positions to said notches $b^3$, and the parts are arranged so that the edge of the larger portion of said plate $c$ at one side of said lugs will engage the under side of the recess-bottom $b'$ and the edge of the smaller portion thereof will engage the upper side of said bottom so as practically to close said opening $b^2$. A weight $d$ of suitable form is secured by a rivet $e$ to the under side of plate $c$ between the line between the bearing edges of the lugs $c'$ and its adjacent end, said weight being so formed that it will swing through opening $b^2$ when the plate $c$ is swung on its lugs $c'$, so that the edge portion of the plate adjacent the weight may bear on the bottom $b$ of the recess. The weight $d$ is heavy enough to hold the plate in its closed position, although a small amount of water on the plate will cause it to tip to permit the water to flow over the edges of the plate into the kettle. If it is desired to remove the plate $c$, this may be easily done by drawing it out through notches $b^3$, the weighted end of the plate forming a convenient handle.

Instead of employing two rivets to hold the weight $d$ in place I find it less expensive to form a square hole in the plate and weight, so that when the pin $e$ is riveted to form a head at its ends it will be forced into the corners of the square hole.

It will be apparent that an ordinary tea-kettle may be provided with the form of automatic cover before described without increasing the cost of manufacture as compared with a kettle having the ordinary cover, which has none of the advantages in the way of convenience possessed by the construction above described.

While the above-described form of my invention is especially advantageous in the original construction of the kettle, yet it may be advantageously employed in the bottom of a receptacle which is adapted to fit into the usual top opening of the kettle in place of the cover. This application of my invention is illustrated in Figs. 3 and 4, in which is shown a cup or basin $g$, having a concave bottom $g'$, provided with an opening $g^2$, said opening being closed by a weighted concave valve-plate $h$ of substantially the same shape as the cover or plate $c$, and in substantially the same manner the plate $h$ is provided with pivot-lugs $h'$, which bear on the bottom $g'$ at the ends of notches $g^3$ therein. As this instance it is not desirable to have the plate $h$ removable it is provided with lugs $h^2$, (indicated by dotted lines in Fig. 3,) which are adapted to engage the under side of the bottom $g'$ directly opposite the lugs $h'$. In assembling the parts the lugs $h^2$ are bent so that they will pass through the notches $g^3$, and then they are bent back into the position shown.

To prevent smoke from blackening the sides of the kettle and heat from injuring or discoloring the finish thereon, I provide a horizontally-projecting annular rib $f$ on the side of the kettle adjacent its bottom. Said rib may be easily formed in the process of making the kettle and effectively protects the sides of the kettle from smoke and heat by deflecting the same to one side.

Having thus described my invention, what I claim as new, and desire to secure by Letters Patent, is—

1. A kettle having a top opening, a valve-plate extending through said opening and having oppositely-disposed pivot-lugs supported on the upper side of the walls surrounding said opening and located between the ends of the plate, the portion of said plate at one side of said lugs being adapted to bear against the under side of said walls and the opposite portion of said plate against the upper side thereof, and means for normally holding said portions of said plate in engagement with said walls to close said opening, substantially as described.

2. A kettle having a recess in its top, the bottom of said recess having an opening and having oppositely-disposed notches therein leading from said opening, a valve-plate extending through said opening and located at its edges in said notches and having pivot-lugs adapted to engage the bottom of said recess adjacent the ends of said notches, the portion of said plate at one side of said lugs being adapted to engage the under side of said bottom, and at the opposite portion thereof to engage the upper side of said bottom to close said opening, and means for normally holding said portions of said plate in engagement with said bottom, substantially as described.

3. A kettle having a recess in its top, the bottom of said recess having an opening, a valve-plate extending through said opening and having pivot-lugs bearing on said bottom and disposed between the middle and one end of said plate, the larger portion of said plate at the one side of said lugs being adapted to bear against the under side of said bottom and the smaller portion thereof being adapted to bear against the upper side of said bottom, and a weight on said smaller portion for holding said portions in engagement with said bottom to close said opening, substantially as described.

4. A kettle having a recess in its top, the bottom of said recess having an opening, a valve-plate extending through said opening and having pivot-lugs bearing on said bottom and disposed between the middle and one end of said plate, the larger portion of said plate at the one side of said lugs being adapted to bear against the under side of said bottom and the smaller portion thereof being adapted to bear against the upper side of said bottom, and a weight connected to the under side of the smaller portion of said plate for holding said plate in position to close said opening, said weight being arranged to pass through said opening when the plate is in the closed position, substantially as described.

5. A kettle having a recess in its top, the bottom of said recess having an opening and having oppositely-disposed notches therein leading from said opening, a valve-plate extending through said opening and located at its edges in said notches and having pivot-lugs adapted to engage the bottom of said recess adjacent the ends of said notches, the portion of said plate at one side of said lugs being adapted to engage the under side of said bottom, and being of less width than the distance between the inner ends of said notches, to permit ready removal of said plate, the opposite portion thereof being adapted to engage the upper side of said bottom, and means for normally holding said plate in the position to close said opening, substantially as described.

6. A receptacle having a top opening, a removable cover for closing said opening having pivotal supports at opposite sides thereof engaging the wall about said opening, the portion of said cover at one side of said pivotal supports being insertible in said opening to bring said supports into engagement with said wall, and said cover being balanced on said supports to swing automatically into engagement with said wall to close said opening, substantially as described.

7. A receptacle having a top opening, a removable cover having a portion thereof extending through said opening, and having pivotal supports at opposite sides thereof engaging the wall about said opening, the portion of said cover at one side of said pivotal supports being insertible in said opening to bring said supports into engagement with said wall, the under side of the opposite portion thereof being adapted to engage the corresponding portion of said wall, said cover being balanced normally to hold such portions in engagement, substantially as described.

8. A receptacle having a top opening, a removable cover for closing said opening having pivotal supports at opposite sides thereof engaging the wall about said opening, the portion of the cover at one side of the line between said supports being of materially greater area than the portion at the other side thereof, and said portion of the greater area being insertible in said opening to bring said supports in engagement with said wall, the portion of less area thereof being counterweighted to swing the cover into its closed position, substantially as described.

9. A receptacle having a top opening, a removable cover for closing said opening having pivotal supports at opposite sides thereof engaging the wall about said opening, the portions of the cover at one side of the line tween said supports being of materially greater area than the portion at the other side thereof, and said portion of the greater area being insertible in said opening to bring said supports in engagement with said wall, the cover portion of less area being of greater area than the corresponding portion of said opening and counterweighted to swing the edge portion thereof into engagement with the surrounding wall portion to close said opening, substantially as described.

In testimony whereof I have signed my name to this specification in the presence of two subscribing witnesses.

ALONZO W. CRAM.

Witnesses:
L. H. HARRIMAN,
H. B. DAVIS.